United States Patent [19]

Diel

[11] Patent Number: 5,504,641

[45] Date of Patent: Apr. 2, 1996

[54] FLEXURAL PIVOT MECHANISM FOR ROTARY ACTUATORS IN DISK DRIVES

[75] Inventor: Mark A. Diel, Boulder, Colo.

[73] Assignee: Maxtor Corporation, Longmont, Colo.

[21] Appl. No.: 162,485

[22] Filed: Dec. 3, 1993

[51] Int. Cl.[6] .......................... G11B 21/08; G11B 21/16
[52] U.S. Cl. ...................... 360/106; 360/104; 360/97.01; 369/253; 369/255; 384/2
[58] Field of Search ................................ 360/104, 105, 360/106, 97.01, 98.01, 137; 369/253, 250, 247, 255; 384/2

[56] References Cited

U.S. PATENT DOCUMENTS

| | | | |
|---|---|---|---|
| 4,555,189 | 11/1985 | Donkin | 384/495 |
| 4,716,483 | 12/1987 | Walsh | 360/106 |
| 4,860,137 | 8/1989 | Shtipelman | 360/106 |
| 4,881,139 | 11/1989 | Hazebrouck | 360/106 |
| 4,888,656 | 12/1989 | West | 360/106 |
| 4,891,722 | 1/1990 | Ekhoff | 360/106 |
| 5,005,095 | 4/1991 | Wagner | 360/106 |
| 5,050,026 | 9/1991 | Goss | 360/106 |
| 5,051,855 | 9/1991 | Ghose et al. | 360/106 |

FOREIGN PATENT DOCUMENTS

| | | | |
|---|---|---|---|
| 1-271979 | 10/1989 | Japan | 360/137 |

*Primary Examiner*—Stuart S. Levy
*Assistant Examiner*—Craig A. Renner
*Attorney, Agent, or Firm*—Sheridan Ross & McIntosh

[57] ABSTRACT

A flexural bearing for an actuator assembly of a magnetic-disk drive includes a first and a second resilient member (10 and 12) and a third resilient member (14). The resilient members are attached to a base plate (40) of the disk drive and pivotally support an actuator body (16). The third resilient member includes an tensioning spring (18). The first and second resilient members are coupled to the base plate at two distinct locations and share a common anchor point on the actuator body.

14 Claims, 5 Drawing Sheets

FLEXURAL PIVOT MECHANISM FOR ROTARY ACTUATORS IN DISK DRIVES

FIELD OF THE INVENTION

The present invention relates to magnetic-disk drives, particularly to an improved pivot mechanism for rotary actuators employed in such disk drives.

BACKGROUND OF THE INVENTION

Magnetic-disk drives generally utilize rotary actuators to position a stack of magnetic read-and-write heads (also known as transducers) with respect to an array of magnetic disks rotationally mounted on a spindle. A read-and-write head is moved to a particular track of a magnetic disk to gain access to the information recorded on that track.

A rotary actuator of a magnetic-disk drive usually comprises a housing, a shaft that is pivotally installed within the housing on precision bearings, and an array of stacked arms for supporting the read-and-write heads, i.e., a head-arm assembly. The head-arm assembly is keyed to, or is integral with, the shaft. Typically, a voice-coil motor pivots the head-arm assembly to position the transducers at selected radii (or tracks) of the magnetic disks.

However, the pivoting mechanism of the above-described actuator has a number of inherent flaws, one of which is the internal resistance in the bearings that support the shaft. Since the inner races of these bearings are usually bonded to or have an interference fit with the actuator shaft and the outer races are bonded to or have an interference fit with the actuator housing, it is difficult to control the bearing load, i.e., the residual force directed along the axis of the shaft. Temperature-induced dimensional variations within the actuator assembly multiply existing bearing loads, creating rotational resistance.

Accordingly, as bearing loads go up, the amount of torque required to pivot the actuator shaft, and hence the head-arm assembly, becomes greater. Also, additional energy is needed to overcome rotational drag produced by the bearing lubricant. The increase in resistance encountered by the voice-coil motor causes the positioning error of the transducers to rise proportionally. Excessive positioning error induces data corruption, i.e., recorded data cannot be recovered or new data is written undesirably and destructively. Furthermore, mechanical resistance in the pivoting mechanism of the actuator limits the storage capacity of the disk drive and increases power consumption.

Another shortcoming associated with the pivoting mechanism is the low-frequency resonance of the bearing balls as the actuator imparts small angular displacements to the head-arm assembly. During such displacements, the bearing balls deflect instead of rotating, thus producing low-frequency resonant vibration that further impairs positioning accuracy, data-access speed, and memory-storage capabilities of the disk drive.

As an added disadvantage, actuator bearings must be precision made to satisfy the critical positioning requirements of the read-and-write heads. The cost of these exacting components greatly increases the expense of disk-drive assemblies. Moreover, actuator bearings cannot withstand external shocks a disk drive may experience when transported.

SUMMARY OF THE INVENTION

It is accordingly an object of the invention to provide an improved pivot mechanism for rotary actuators employed in magnetic-disk drives that overcomes the foregoing disadvantages, e.g., which has negligible rotational resistance; which is unaffected by thermal dimensional variations of the disk-drive assembly; which is not susceptible to low-frequency resonant vibration; which can withstand external shocks; and which is inexpensive and simple to manufacture and assemble. Further objects and advantages will become apparent after consideration of the ensuing description and the accompanying drawings.

In the preferred embodiment of the present invention, the actuator body is supported by two elongated resilient members having identical shape and size and a third elongated resilient member with a tensioning spring at its distal end. The proximal ends of the two identical resilient members are both attached to the actuator body at a first anchor point. The proximal end of the third resilient member is attached to the actuator body at a second anchor point. Both the first and the second anchor points are situated along a straight horizontal line that passes through the geometrical center of rotation of the actuator body and are equidistant from that center.

The resilient members are oriented such that the two identical members overlap the third member along the actuator body. To provide clearance between the resilient members and the actuator body when the latter pivots, the resilient members contain longitudinal recesses.

The tensioning spring of the third resilient member is secured to the base plate of the disk-drive housing and is preloaded. The distal ends of the two identical resilient members are symmetrically offset to either side of the horizontal line defined by the third resilient member and are also attached to the base plate.

When the actuator is in the middle of its stroke, the two identical resilient members oppose the tensile force that the third resilient member exerts on the actuator body. Thus, in the middle of the actuator stroke the resilient bearing members exert no net force on the actuator body.

As the action of the voice-coil motor rotates the actuator body in either direction from its neutral position in the middle of the actuator stroke, the individual resilient members become loaded in bending and begin to exert torsional forces on the actuator body. Thus, the tension in the third resilient member results in a torsional force applied to the actuator body in one direction. Conversely, as the two identical resilient members resist the bending forces they experience, they produce torsional forces acting on the actuator body in the opposite direction. The torsional force exerted by the third resilient member on the actuator body is always equal and opposite to the combined torsional forces exerted on the actuator body by the two identical resilient members. Hence, a force balance is maintained during the full range of actuator motion such that the actuator body (which supports the head-arm assembly) sees no net torque, except that supplied by the voice-coil motor.

BRIEF DESCRIPTION OF THE DRAWINGS

The present invention is illustrated by way of example, and not by way of limitation, in the figures of the accompanying drawings, wherein.

DETAILED DESCRIPTION

In the following description, numerous specific details such as dimensions, material types, etc., are set forth in order to provide a thorough understanding of the present invention. However, it will be obvious to one skilled in the art that the invention may be practiced without these specific details. In other instances, well-known elements and processing techniques have not been shown and explained in particular detail in order to avoid unnecessarily obscuring the present invention.

Figure 1:
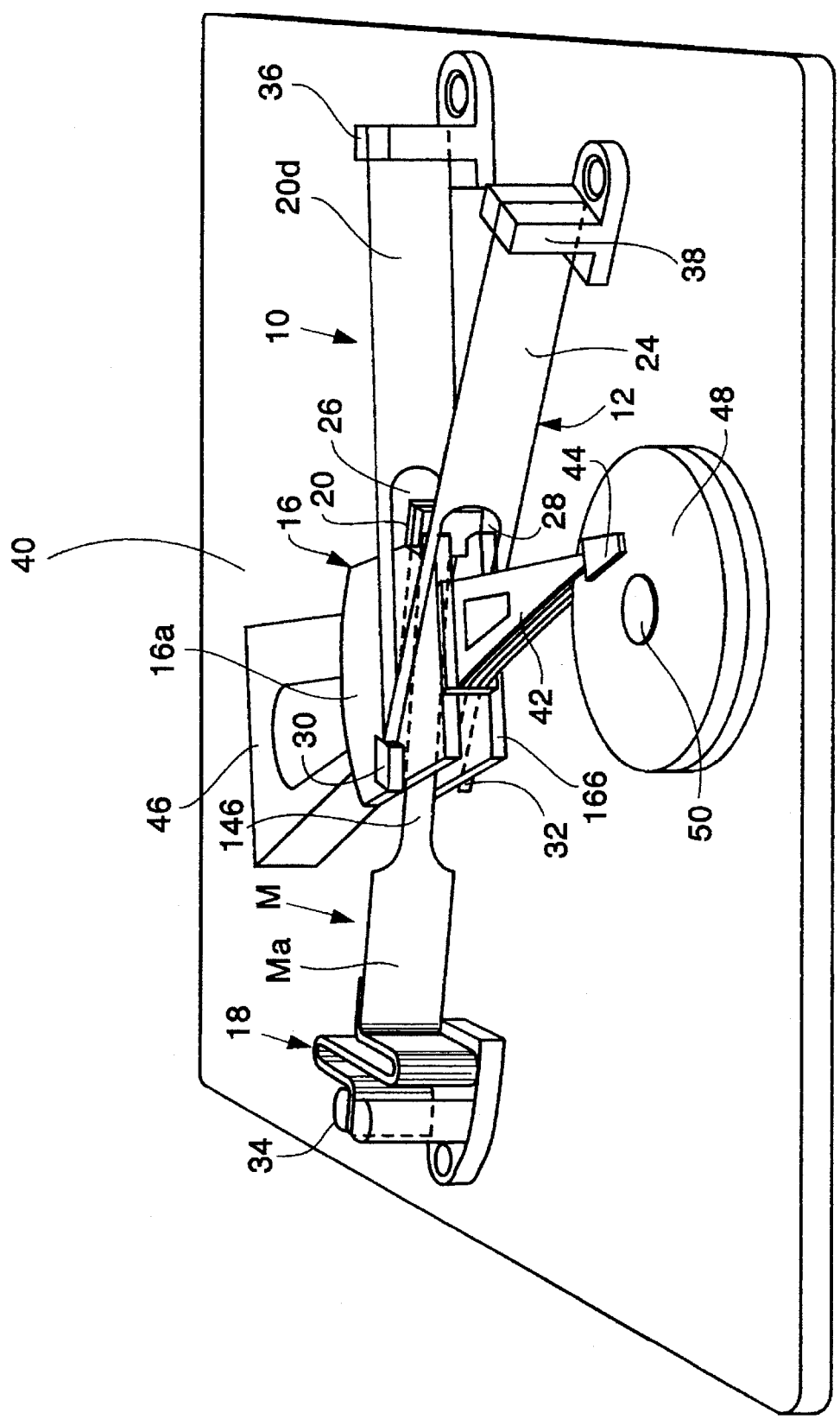
FIG. 1 is a perspective view of the flexural pivot bearing of the present invention.

FIG. 1 shows a perspective view of a preferred embodiment of a flexural-pivot bearing according to the present invention. The flexural-pivot bearing includes first and second identical resilient members 10 and 12 and a third resilient member 14. The resilient members collectively support an actuator body 16 that possesses a top plate 16a and a bottom plate 16b. An S-shaped tensioning spring 18 is integral with the distal end of member 14.

Member 14 includes a flat main section 14a and a flat shank section 14b. The shank section passes between plates 16a and 16b and is attached, e.g., by a weld, to a mount 20, which is integral with body 16. Members 10 and 12 comprise flat main sections 22 and 24 having cutouts 26 and 28, respectively. The proximal ends of members 10 and 12 are anchored, e.g., by welding, to mounts 30 and 32, integral with body 16. The leading edge of spring 18 and distal ends of members 10 and 12 are secured to vertical clamping posts 34, 36, and 38, respectively. The clamping posts are in turn connected to a base plate 40 with screw-type fasteners (not shown).

A head-arm assembly 42 that carries read-and-write heads 44, only one of which is shown, is rigidly coupled to plates 16a and 16b. By rotating actuator body 16, a voice-coil motor 46 positions the heads relative to a plurality of magnetic disks 48 mounted on a spindle 50.

Figure 2:
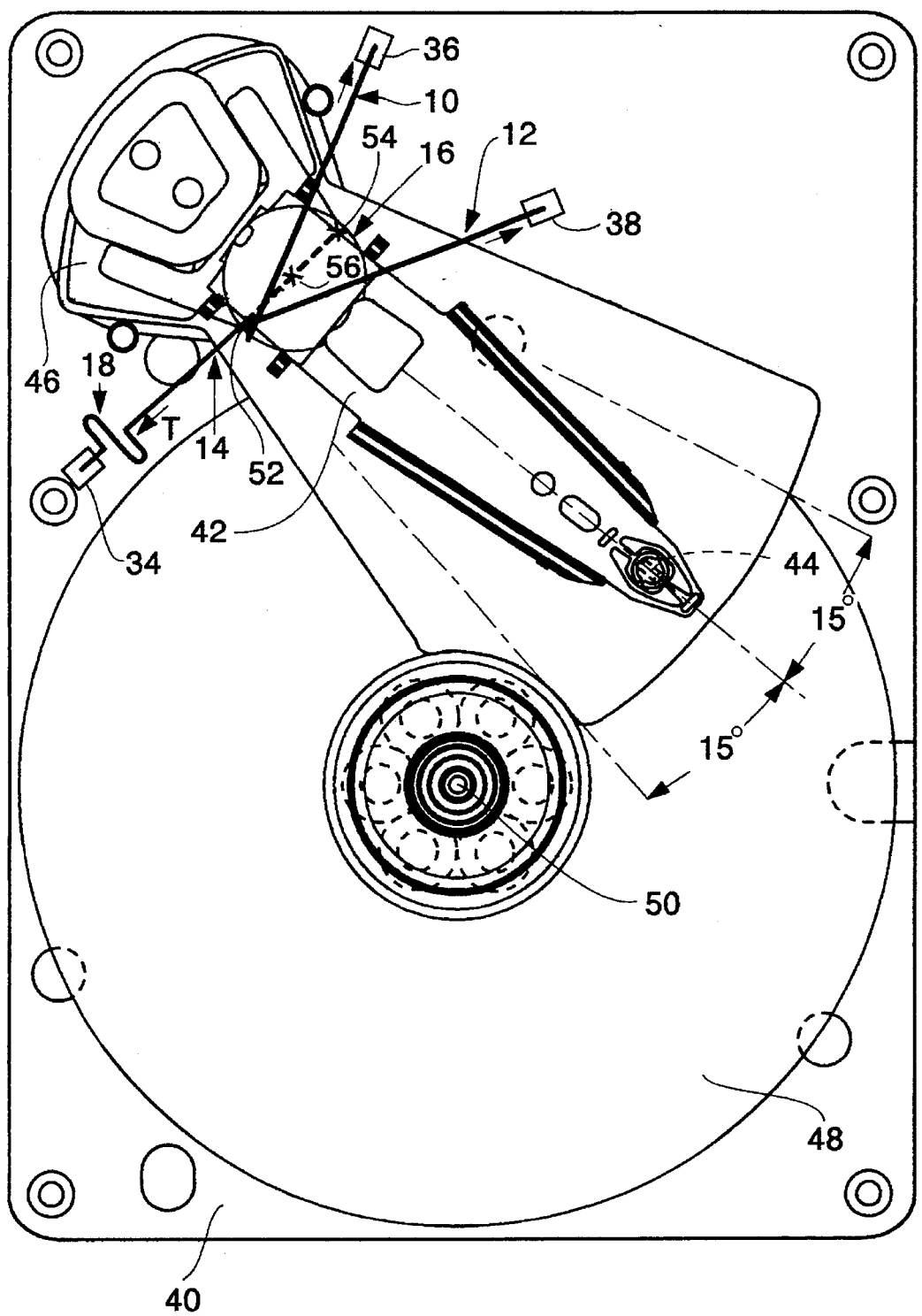
FIG. 2 is a top view of the flexural pivot bearing of FIG. 1 in a first position.

A top view of the flexural-pivot bearing in a neutral state (in the middle of the actuator stroke) is shown in FIG. 2. The resiliency of members 10, 12, and 14, along with extension of spring 18, allows voice-coil motor 46 to pivot head-arm assembly 42 approximately 15° in either direction, thus providing a total actuator-motion range of about 30°.

As shown in FIG. 2, resilient members 10 and 12 are attached to actuator body 16 at a point 52, while member 14 is anchored to body 16 at a point 54. Both attachment points 52 and 54 lie on a straight line that passes though a phantom point 56. Points 52 and 54 are equidistant from phantom point 56, which is the geometrical center of rotation of the actuator body. Posts 36 and 38 are also equidistant from point 56. As the actuator body rotates, phantom point 56 moves slightly in the horizontal plane with respect to base plate 40. The curvilinear displacement path of point 56 is repeatable and may be easily predicted.

When the flexural bearing is in its neutral state (FIG. 2), spring 18 is prestretched, loading member 14 in tension. However, the actuator body experiences no net force since tension of the spring is opposed by members 10 and 12 that are anchored to base plate 40.

Figure 3:
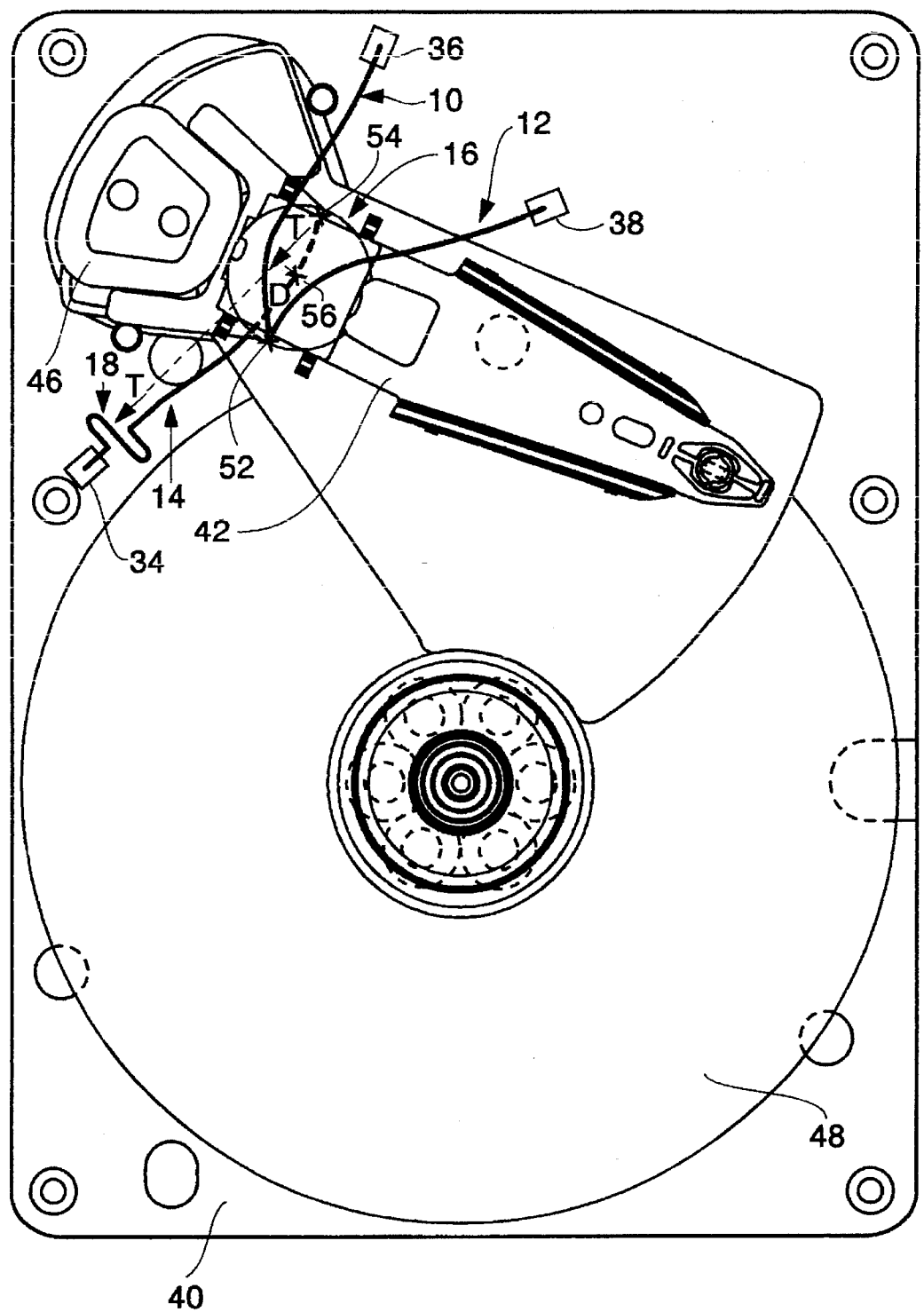
FIG. 3 is a top view of the flexural pivot bearing of FIG. 1 in a second position.
Figure 4:
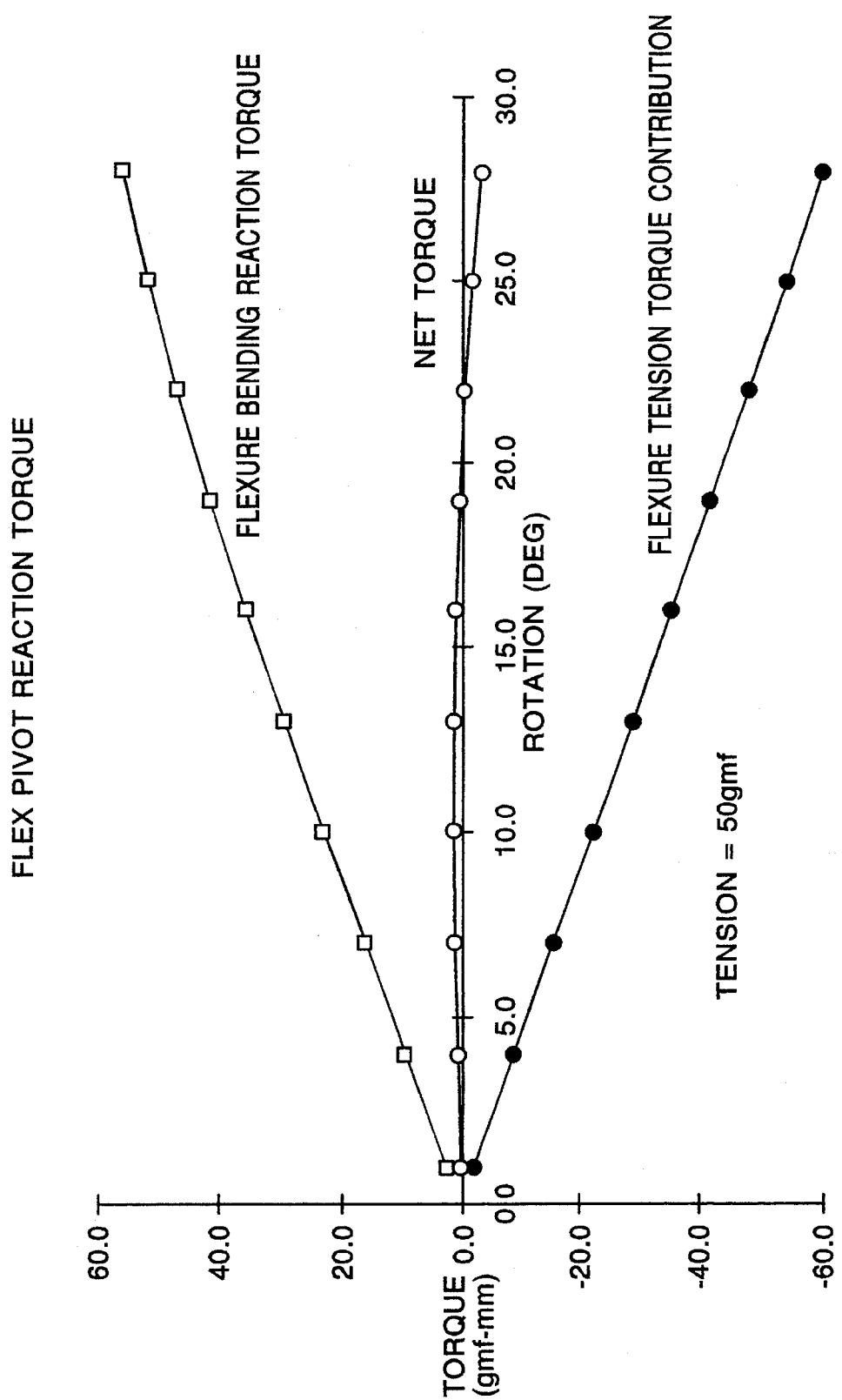
FIG. 4 is a plot illustrating the force characteristics associated with the flexural pivot bearing of the present invention.

As voice-coil motor 46 pivots the actuator body, e.g., as shown in FIG. 3, members 10 and 12 experience bending loads. Consequently, actuator body 16 is subjected to a clockwise torque resulting from the bending resistance of members 10 and 12. Furthermore, the tension of spring 18 produces a counterclockwise torque on the actuator body since tensile force T, applied to body 16 at point 54, has a moment arm D with respect to point 56. As illustrated in FIG. 4, the opposing torsional forces affecting the actuator body are always equal in magnitude and, thus, cancel each other. Therefore, the only net torque the actuator assembly experiences throughout its full range of motion is the torsional force exerted by the voice-coil motor.

Since the effect of thermal variations on each of the resilient members is equivalent, the rotational resistance of the flexural-pivot bearing is temperature independent. Moreover, because of the resiliency of the supporting members, the actuator assembly is insensitive to external shocks. Additionally, the simplicity of the flexural-pivot bearing, as well as the absence of any precision components, allows to considerably reduce the manufacturing costs of the actuator assembly. Furthermore, low-frequency vibration problems, commonly associated with ball bearings, have been eliminated.

In the preferred embodiment of the present invention the resilient members of the bearing are made of stainless steel. Each member is approximately 0.05 mm thick.

Figure 5:
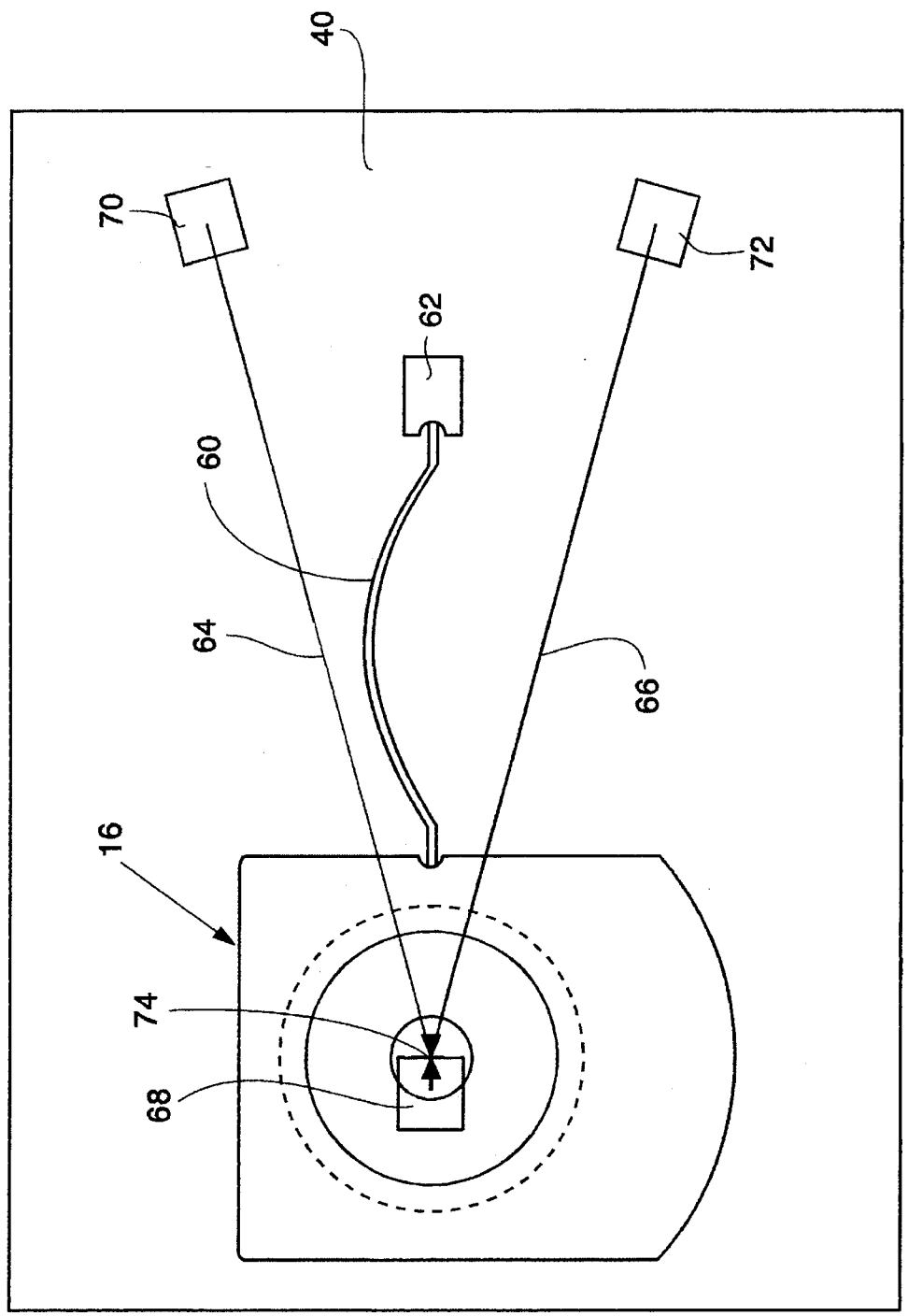
FIG. 5 is a top view of another embodiment of the present invention.

In another embodiment of the present invention shown in FIG. 5, resilient member 14 and tensioning spring 18 are replaced with a compression (leaf) spring 60. The proximal end of the spring presses against actuator body 16 and its distal end is anchored to base plate 40 at a clamping post 62. The proximal ends of identical resilient members 64 and 66 are attached to the actuator body at a mount 68, e.g., by welding. The distal ends of members 64 and 66 are connected to the base plate via clamping posts 70 and 72. Members 64 and 66 attach to body 16 at a point 74, which is the geometrical center of rotation of the actuator body. Posts 70 and 72 are equidistant from point 74. As the actuator assembly rotates, point 74 is displaced slightly, tracing a repeatable curvilinear path in the horizontal plane.

The operation principle of the flexural-pivot bearing with a compression spring is similar to that of the bearing with a tensioning element, except that a constant compressive force is utilized instead of a constant tensile force.

Thus, a greatly improved pivot mechanism for rotary disk-drive actuators has been provided. This mechanism comprises a flexural pivot bearing which has negligible rotational resistance; which is unaffected by thermal dimensional variations of the disk-drive assembly; which is not susceptible to low-frequency resonant vibration; which can withstand external shocks; and which is inexpensive and simple to manufacture and assemble.

Although the flexural-pivot bearing has been described in the form of two specific embodiments, its configurations and materials are given only as examples, and many other modifications of the bearing are possible. For example, the resilient elements may have different shape, length, and width. Spring 18 may be U-shaped or may have other configurations. Bearing components may be made of a material other than stainless steel.

Therefore, the scope of the invention should be determined, not by the examples given, but by the appended claims and their equivalents.

What is claimed is:

1. An apparatus for pivotally supporting an actuator of a magnetic-disk drive, the actuator including a top plate and a bottom plate and having a center of rotation, the magnetic-disk drive having a housing, the apparatus comprising;

a first resilient member having a first end and a second end, the first end being attached to the housing, the second end being mounted between the top and bottom plates; and second and third resilient members, each having a first end and a second end, the first ends of the second and third resilient members being attached to the housing, the second and third resilient members each having a recess for receiving the top plate, the bottom plate and the actuator, the second ends of the second and third resilient members connecting together at a top attaching mount mounted to the top plate and a bottom attaching mount mounted to the bottom plate.

2. The apparatus of claim 1 wherein said actuator is rotated by a motor, said actuator supporting at least one read-and-write head to be positioned with respect to at least one magnetic disk.

3. The apparatus of claim 2 wherein said motor is a voice-coil motor.

4. The apparatus of claim 1 wherein said resilient members are made of stainless steel.

5. The apparatus of claim 1 wherein said second and third resilient members are attached to said housing at two distinct locations.

6. The apparatus of claim 1 wherein at least one of said resilient members further includes a tensioning element.

7. The apparatus of claim 6 wherein said tensioning element is an S-shaped spring.

8. The apparatus of claim 1 wherein the mounting of the first resilient member between the plates and the top and bottom attaching mounts are equidistant from the center of rotation.

9. An apparatus for pivotally supporting an actuator of a magnetic-disk drive, the actuator having a center of rotation, said magnetic-disk drive having a housing, said apparatus comprising;

a first and second resilient member extending from the housing toward a line of convergence and connecting to the actuator at a point at the line of convergence at the center of rotation of the actuator thereby defining a convergence angle, the actuator extending from the center of rotation in a direction generally perpendicular to an intersect line, the intersect line generally bisecting the convergence angle of the first and second resilient members; and compression means interconnected between the actuator and the housing for providing a compression force between the actuator and the housing, the compression means positioned between the first and second resilient members generally along the intersect line.

10. The apparatus of claim 9 wherein said compression means comprises a leaf spring.

11. The apparatus of claim 9 wherein said first and second resilient members are attached to said actuator at a common location.

12. The apparatus of claim 9 wherein said first and second resilient members are attached to said housing at two distinct locations.

13. An apparatus for pivotally supporting an actuator of a magnetic-disk drive, the actuator having a center of rotation, said magnetic-disk drive having a housing, said apparatus comprising:

tensioning means interconnected to the actuator and the housing, and first and second resilient members extending from the housing toward a line of convergence and connecting to the actuator at a point at the line of convergence thereby defining a convergence angle, the actuator extending from the center of rotation in a direction generally perpendicular to an intersect line defined by the point of connection and the center of rotation of the actuator, the intersect line generally bisecting the convergence angle of the first and second resilient members, wherein the tensioning means and the first and second resilient members are arranged such that the tensioning means provides a tensioning force between the actuator and the housing that opposes forces exerted on the actuator by the first and second resilient members.

14. The apparatus of claim 13 wherein the tensioning means comprises an S-shaped spring.

* * * * *